UNITED STATES PATENT OFFICE.

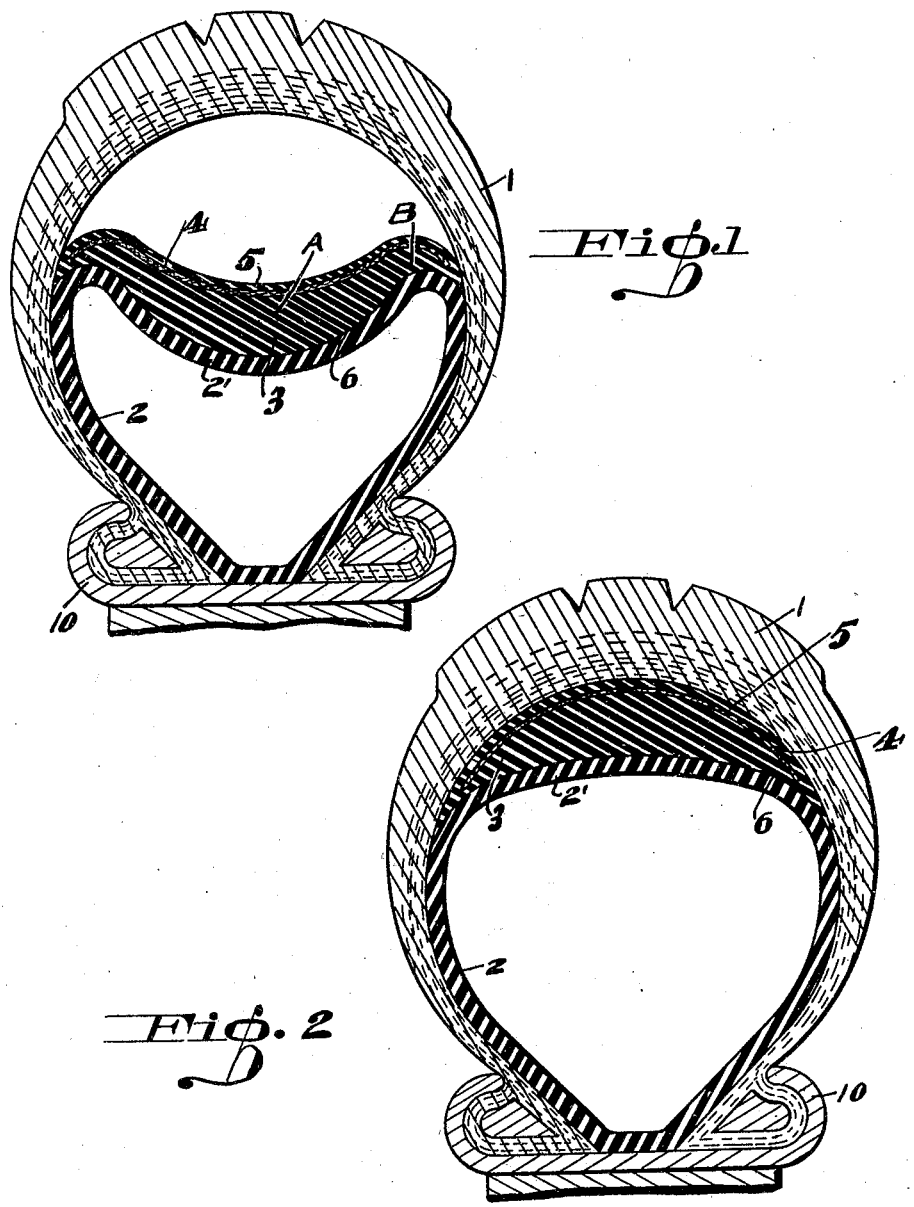

HENRY C. PRIVETT, OF LONG BEACH, CALIFORNIA, ASSIGNOR OF ONE-HALF TO CHARLES R. PRIVETT, OF BURBANK, CALIFORNIA, THREE-SIXTEENTHS TO HELEN E. PRIVETT AND ONE-SIXTEENTH TO HOLLIS F. PRIVETT, BOTH OF LONG BEACH, CALIFORNIA.

PUNCTURE-CLOSING TREAD-STRIP.

1,390,249.  Specification of Letters Patent.  Patented Sept. 6, 1921.

Application filed April 29, 1920. Serial No. 377,574.

*To all whom it may concern:*

Be it known that I, HENRY C. PRIVETT, a citizen of the United States, residing at Long Beach, in the county of Los Angeles and State of California, have invented new and useful Improvements in Puncture-Closing Tread-Strips, of which the following is a specification.

This invention relates to a tread strip to be applied in any manner to the tread of a pneumatic tire inner tube. An object of the invention is to provide a strip to be applied to the tread portion of a pneumatic tire inner tube, which will close or seal any ordinary puncture that may occur. The tread strip of course protects the tube against puncture; but its main object is to seal a puncture.

A particular and noteworthy feature of the invention is the provision of a tread strip that can be either made, or formed, or attached, to any inner tube at time of manufacture or readily applied to any ordinary inner tube. This feature of the invention makes it practical and of commercial value.

The tread strip comprises a body of live rubber, or the like, molded or shaped so that when it is deflated its inner face, that is its face which engages the surface of the inner tube, is of greater area or extent when deflated than when inflated. The construction of the tread strip causes the inner parts to be under compression when the tube is inflated. A non-extensible member is arranged at or near the outer surface of the strip to cause the material at the outer portion of the strip to be of constant density, or constant size, and thus cause compression of the inner parts when the shape of the strip is changed by inflation.

There are other objects and features of the invention which will be best understood from the following specification throughout which reference is had to the accompanying drawings in which—

Figure 1 is a transverse sectional view through a typical automobile wheel rim, tire, and inner tube showing the tread strip provided by the invention arranged in connection with the inner tube which is shown in deflated condition; and Fig. 2 is a sectional view similar to Fig. 1 showing the inner tube and tread strip in its inflated condition.

Throughout the drawings numeral 10 designates a typical automobile wheel rim, adapted to carry a tire casing 1 and an inner tube 2. The particular tire casing 1 and inner tube 2 herein set forth are merely shown as typical tire and inner tube and it will be understood that the invention is not limited or restricted in any way to use or embodiment in connection with a tire casing of any particular size or construction or an inner tube of any particular size or construction. Further this tread strip may be applied to an inner tube whether new or old, and in fact regardless of its condition.

The tread strip 3, which is the member provided by the invention, is an annular body of live rubber, or other like resilient material, molded or formed so that its central or middle portion is preferably smaller in diameter than its outer or side portions. The normal cross sectional configuration of the tread strip 3, is preferably of the form illustrated in Fig. 1 with the body being comparatively thick at its middle portion A and tapered toward its side or outer edges so as to be comparatively thin at its outer edge portions B. The molded or normal shape of the tread strip 3 is clearly illustrated in Fig. 1 of the drawings. The tread strip when in this normal condition is uniform in density throughout.

The tread strip 3, is secured to or mounted on the outer tread portion of the inner tube 2 in the manner clearly illustrated in the drawings. It will be understood that any suitable means may be employed to secure the tread strip 3 to the inner tube 2; for instance, the tread strip may be cemented or vulcanized to the inner tube.

A layer of non-extensible material 4, such as fabric or the like, is embedded or formed in the tread strip 3 near, or substantially at, the outer surface 5 of the tread strip. The non-extensible member 4 extends completely around the tread strip and also substantially completely across the outer face, extending into the thin edge portions B. This non-extensible member, although not extensible transversely, is extensible longitudinally to allow the tread strip to flex outwardly and conform with the inside of the casing; and if fabric is used it may be laid so that it will satisfy these conditions. The non-extensible member 4, it will be understood, may be formed in the tread strip 3 in any suitable manner; for instance, it may be embedded in the rubber or body of the tread strip when it is formed or molded, or the body portion of the tread strip may be formed and the non-extensible member 4 and the covering of rubber over the non-extensible member 4 may be applied subsequently. The covering of rubber over member 4 is merely to prevent chafing.

As has been before stated, Fig. 1 of the drawings illustrates the normal shape or cross sectional configuration of the tread strip 3 and the inner tube 2 before the tube 2 has been inflated. When the inner tube 2 is inflated the tread strip 3 is forced outwardly until its outer surface 5 engages and bears against the inner wall of tire casing 1. Its shape is thus changed from that shown in Fig. 1 to that shown in Fig. 2. Due to the non-extensible member 4 being embedded in the tread strip 3 near its outer surface 5, the outer surface or outer portion of the tread strip can not expand in conforming to the inner wall of casing 1. When the outer surface 5 is in engagement with the inner wall of tire casing 1 the inner surface 6, of course, takes the position shown in Fig. 2, and is considerably less in area or extent than it was in normal condition (Fig. 1). This decrease in area of the inner surface parts 6 of the tread strip is accompanied by a considerable increase in density, or compression, of the material at and near the inner surface 6. As a matter of fact, the increase in density, or compression, of the material at and near the surface 6 is considerable, due to the fact that the outer surface 5 of the tread strip is positively prevented from stretching or expanding, thereby forcing the inner parts into highly concentrated compression. Further, it will be understood that if the outer or tread portion of the inner tube 2 is cemented or secured to the inner surface 6 of the tread strip 3, the decrease in area of the inner surface 6 of the tread strip 3 must also cause a decrease in area of the tread portion of inner tube 2 and consequently compress the material in the tread portion of inner tube 2. In other words, the rubber of the inner tube becomes, to all purposes and intents, an active part of the inner compressing portion of the tread strip and itself, as well as the tread strip, acts to close a puncture. When the tread portion of the inner tube 2 and also the inner portion of the tread strip 3 are under lateral compression they offer considerable resistance to members or objects passing or tending to pass through them and therefore prevent the tube 2 from being punctured or ruptured by many objects, or under many circumstances, under which an ordinary inner tube not equipped with the tread strip would be punctured or severely damaged. Further, in the event that the inner tube 2 is punctured or penetrated by an object, such as a nail, or the like, the retraction or withdrawal of the object will not leave an opening in the tube and tread strip through which the air may escape from within the inner tube 2; because a hole or rupture in the tread strip and tube will immediately be closed and sealed tight by the compressive action.

It will be seen that the action of my tread strip depends upon its having a normal condition in which the inner surface is of less extent than when inflated and in which the outer surface portions are held against expansion, thus forcing the inner parts into compression when inflated. In this arrangement it is an important feature that the non-extensible fabric at its outer edges lies close to the inner surface of the strip; because the outer edge portions of the inner surface parts are hereby directly connected to the fabric, without possibility of relative movement between those portions and the fabric. The outer edge portions being thus anchored, they form, in effect, abutments between which the inner surface parts of the strip are effectively and highly compressed.

Having set forth a preferred embodiment of my invention I do not wish to restrict myself to the specific details above enumerated but wish to reserve to myself any changes or variations that may present themselves to those skilled in the art or that may fall within the scope of the following claims.

Having described a preferred form of my invention, I claim:

1. A tread strip adapted to be applied to an inner tube, said tread strip formed to be of even density throughout when the tube is deflated and be of unchanged density at its outer portion and of increased density at its inner portion when the tube is inflated.

2. A tread strip adapted to be applied to an inner tube, comprising an annular body of resilient material thick at its center part and tapering to thin edges and a non-extensible strip across the outer surface portions and having its edges at the thin edges of the body and in close proximity to the inner body surface at the edges so as to anchor the outer edge portions of the inner surface parts against movement relative to the non-extensible strip.

3. A tread strip adapted to be applied to an inner tube, comprising an annular body of resilient material thick at its center part and tapering to thin edges formed to have a normal configuration in which its inner surface is of less extent than when it is inflated in a tire; and a non-extensible strip across the outer surface portions and having its edges at the thin edges of the body and in close proximity to the inner body surface at the edges so as to anchor the outer edge portions of the inner surface parts against movement relative to the non-extensible strip.

4. The combination of a resilient inner tube for pneumatic tires and a resilient puncture-sealing tread strip secured to the periphery of the inner tube, said strip being crescent-shaped in cross section, and when the inner tube is deflated having its convex side toward the rim side of the tire casing, but when the inner tube is inflated having its convex side toward the tread side of the tire, whereby the tread strip is subjected to a transverse compression and adapted to automatically seal a puncture through the tread strip.

5. The combination of a resilient inner tube for pneumatic tires and a resilient puncture-sealing tread strip secured to the periphery of the inner tube, a strip of fabric non-stretchable in a transverse direction embedded in said tread strip and disposed near the outer side thereof, said strip being crescent-shaped in cross section and when the inner tube is deflated having its convex side toward the rim side of the tire casing, and when the inner tube is inflated having its convex side toward the tread side of the tire, whereby the portion of the tread strip lying between said strip of fabric is subjected to a transverse compression and adapted to automatically seal a puncture in the tread strip.

In testimony whereof I have signed my name to this specification.

HENRY C. PRIVETT.